United States Patent [19]

Daly

[11] Patent Number: 5,022,371
[45] Date of Patent: Jun. 11, 1991

[54] MOLDED PLASTIC FUEL RAIL FOR AN INTERNAL COMBUSTION ENGINE

[75] Inventor: Paul D. Daly, Troy, Mich.

[73] Assignee: Siemens-Bendix Automotive Electronics L.P., Auburn Hills, Mich.

[21] Appl. No.: 414,885

[22] Filed: Sep. 29, 1989

[51] Int. Cl.⁵ .......................................... F02M 55/02
[52] U.S. Cl. .................... 123/468; 123/52 M
[58] Field of Search ............... 123/468, 52 M, 52 MB, 123/472, 471, 470, 469

[56] References Cited

U.S. PATENT DOCUMENTS

| | | | |
|---|---|---|---|
| 4,457,280 | 7/1984 | Hudson, Jr. | 123/470 |
| 4,475,486 | 10/1984 | Kessler | 123/52 M |
| 4,563,984 | 1/1986 | Ziegler | 123/52 M |
| 4,601,275 | 7/1986 | Weinand | 123/468 |
| 4,690,106 | 9/1987 | Nakayama | 123/52 M |
| 4,756,289 | 7/1988 | Rock | 123/468 |
| 4,768,487 | 9/1988 | Yamamoto | 123/468 |
| 4,794,885 | 1/1989 | Honda | 123/52 M |
| 4,844,036 | 7/1989 | Bassler | 123/468 |
| 4,907,547 | 3/1990 | Daly | 123/52 M |
| 4,911,111 | 3/1990 | Matsunaga | 123/52 MB |
| 4,924,834 | 5/1920 | Bonfiglioli | 123/52 M |

Primary Examiner—Carl Stuart Miller
Attorney, Agent, or Firm—George L. Boller; Russel C. Wells

[57] ABSTRACT

A molded fuel rail block for a multiple cylinder engine having a plurality of air conduits connecting the engine's air intake manifold to the individual air intake passageways provided in the cylinder head of the engine. The fuel rail block further has an injector well associated with each air conduit in which the fuel injector valves of the engine are mounted and a pressure regulator well in which a pressure regulator is mounted. A fuel delivery rail is provided in the fuel rail block which is connected to each of the injector wells and to an input of the fuel regulator well. A fuel return rail is provided in the fuel rail block generally parallel to the fuel delivery rail. The fuel return rail is connected to an exit port of the pressure regulator well. In the preferred embodiment, the air conduits, injector wells, pressure regulator well, fuel delivery rail and fuel return rail are molded from a high temperature plastic material having relatively good thermal insulation properties.

15 Claims, 3 Drawing Sheets

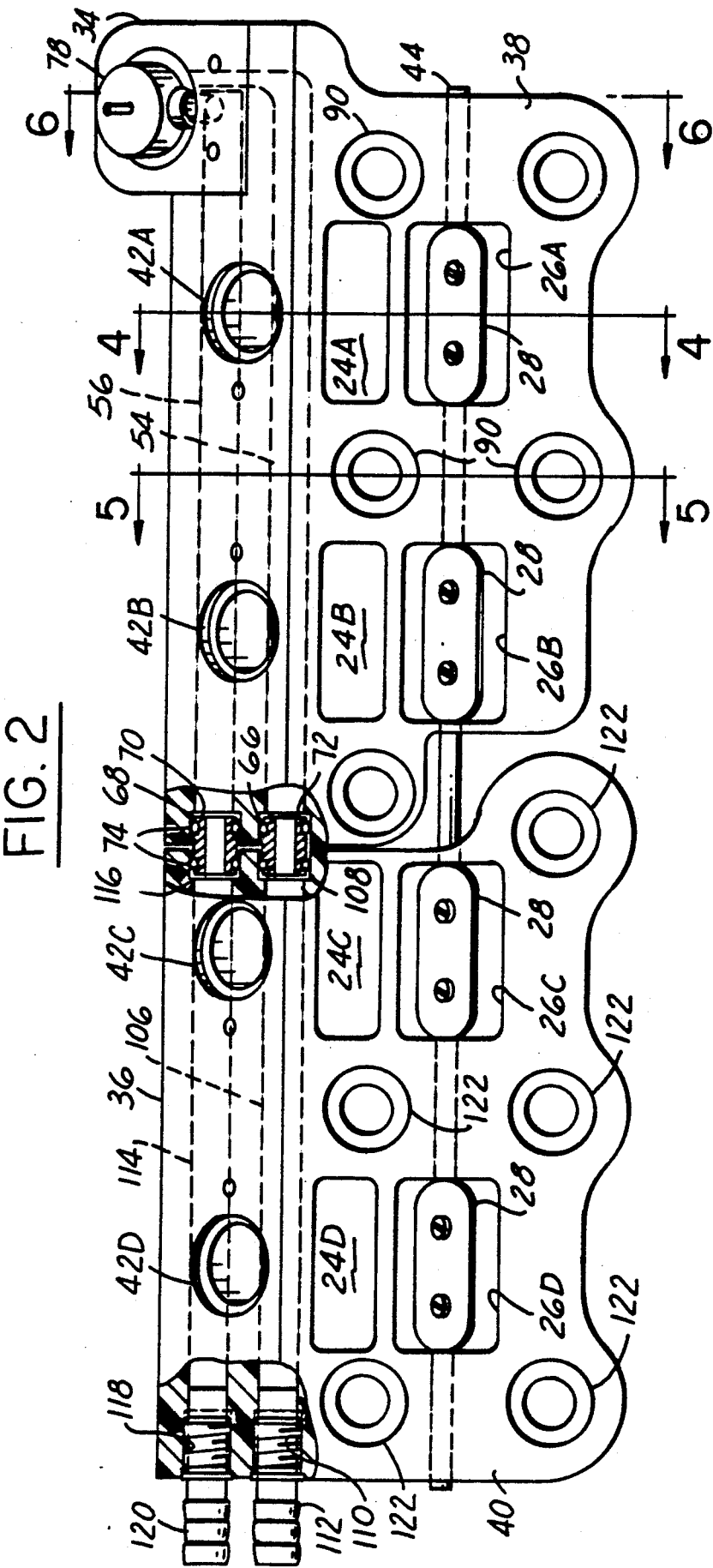

MOLDED PLASTIC FUEL RAIL FOR AN INTERNAL COMBUSTION ENGINE

BACKGROUND OF THE INVENTION

1. Field of the Invention

The invention is related to a multi-point fuel injected internal combustion engine and in particular to fuel rails for providing fuel to the engine's fuel injectors.

2. Description of the Prior Art

In many of the current multi-point fuel injected internal combustion engines, wells for the fuel injector valves are provided directly in the engine's cylinder head and fuel is supplied to the fuel injectors by external fuel rails. The inclusion of the wells for the fuel injectors in the cylinder head has not only increased the manufacturing cost of the cylinder head but also has resulted in excessive heating of the fuel in the fuel injector valves before it is injected into the engine. The molded high temperature plastic fuel rail disclosed herein removes the fuel injector valves from the engine's cylinder head and reduces excessive heating of the fuel prior to being injected into the engine.

SUMMARY OF THE INVENTION

The invention is a fuel rail for an internal combustion engine having at least four cylinders, a fuel injector valve for each cylinder, a source of pressurized fuel, a pressure regulator, an air intake manifold, and a cylinder head having an air intake passageway for each cylinder. The fuel rail has a high temperature plastic first fuel rail block mountable between the cylinder head of the engine and the air intake. The first fuel rail block has at least two air conduits conducting air from the air intake manifold into respective air intake passageways of the cylinder head. At least two injector wells are provided in the first fuel rail block for receiving fuel injectors. Each of the fuel injector wells is associated with a respective one of the air conduits and has an outlet port connected to its associated air conduit. Each fuel injector well has supported therein a fuel injector valve at an angle selected to cause the fuel injector valve to inject fuel directly into the associated air intake passageway of the cylinder head. A fuel pressure regulator well is provided in the fuel rail block for receiving a fuel pressure regulator. The fuel pressure regulator well has an inlet port and an output port. A first fuel delivery rail is provided in the first fuel rail block. The first fuel delivery rail has an inlet end receiving fuel from a source of pressurized fuel and an output end connected to the inlet port of the pressure regulator well. The first fuel delivery rail is also connected to the at least two fuel delivery fuel injector wells to supply fuel to the fuel injectors. A first fuel return rail is also provided in the first fuel rail block. The first fuel return rail has an input end connected to the inlet port of the fuel pressure regulator well and an output port.

The fuel rail also has a high temperature plastic second fuel rail block which also is mountable to the cylinder head. The second fuel rail block has at least two air conduits conducting air from the air intake manifold into a respective one of the remaining air intake passageways of the cylinder head. At least two fuel injector wells are provided in the second fuel rail block, each for receiving a fuel injector therein. Each of the latter fuel injector wells is associated with a respective one of at least two air conduits and has an outlet port connected to its associated air conduit. Each latter injector well supports a fuel injector valve therein at an angle to cause the fuel injector valve to inject fuel directly into the associated air intake passageway. A second fuel delivery rail is provided in the second fuel rail block which is connected to both of the fuel injector wells thereof. The second fuel delivery rail has an inlet end connectable to a source of pressurized fuel and an outlet end. A coupling is provided for connecting the outlet end of the second fuel delivery rail to the inlet end of the first fuel delivery rail. A second fuel return rail is provided in the second fuel rail block. The second fuel return rail has an inlet end and an outlet end connectable to a fuel tank. A coupling connects the inlet end of the second fuel return rail to the outlet port of the first fuel return rail.

One object of the invention is to provide a molded plastic fuel rail which houses the fuel injector valves, the fuel pressure regulator, and fuel inlet and outlet connections.

Another object of the invention is a fuel rail in which the fuel delivery and fuel return passageways are molded therein.

Still another object of the invention is to mold the air conduits between the engine's air intake manifold and the air intake passageway of the cylinder head along with the injector wells to ensure injector alignment relative to the air flow.

Still another object of the invention is to mold the fuel rail from a high temperature plastic material so that the fuel rail becomes a thermal insulator, insulating the air induction system from the cylinder head's temperature, permitting the air induction system to be made from a lower temperature plastic material.

Another object of the invention is that the fuel rail is split into two separate members so that their individual length is not excessive thereby reducing the applied bending force if the mounting face on the cylinder head does not remain flat.

These and other objects of the invention will become more apparent from a reading of the detailed description of the invention in conjunction with the drawings.

BRIEF DESCRIPTION OF THE DRAWINGS

FIG. 2 is a front view of the fuel injector rail showing the structure of the face of the first fuel rail facing the air intake manifold;

DETAILED DESCRIPTION OF THE PREFERRED EMBODIMENT

Figure 1:
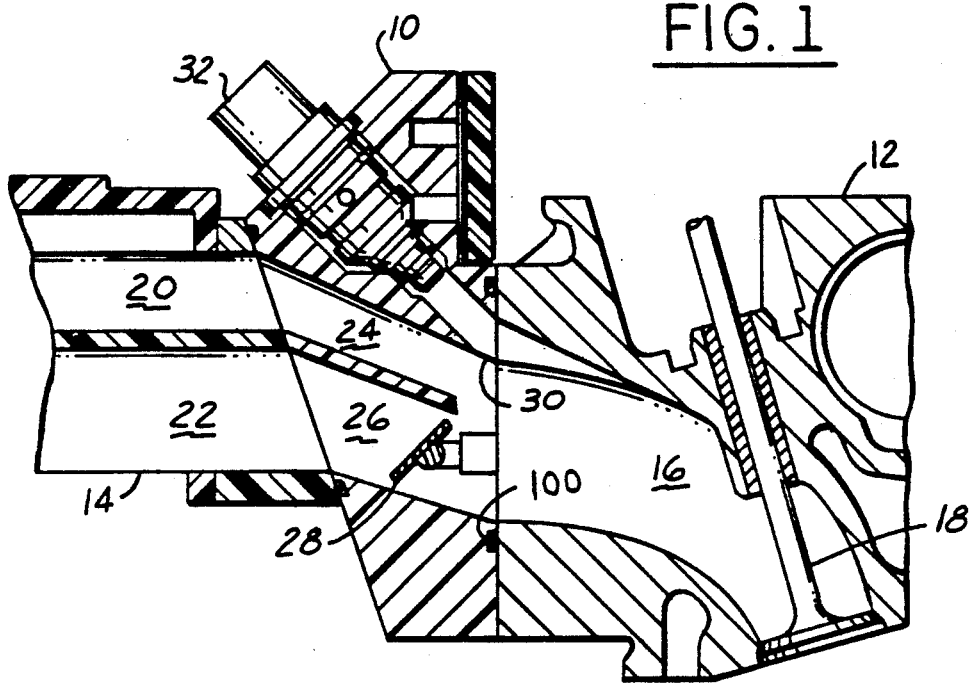
FIG. 1 is a cross-sectional view showing the relationship of the fuel injector rail to the air intake manifold and the engine's cylinder head.

FIG. 1 is a cross-sectional view showing the relationship of a fuel rail 10 with respect to a cylinder head 12 of an internal combustion engine and an air intake manifold 14. The cylinder head 12 has an air intake passageway 16 which directs the air to the engine's combustion chamber. An intake valve 18 is actuated by the engine's crankshaft to admit an air fuel mixture into the engine's combustion chamber during the associated cylinder's intake stroke as is known in the art. The air intake manifold 14 has a primary air passageway 20 and a secondary air passageway 22. The air flow through the primary air passageway 20 and the secondary air passageway 22 is controlled by a throttle valve, not shown, in a conventional manner.

The fuel rail 10 has an upper air conduit 24 receiving air from the primary air passageway 20 of the air intake manifold 14 and a lower air conduit 26 receiving air from the secondary air passageway 22. A wave deflector 28 is disposed in the lower air conduit 26 to prevent propagation of air pressure waves back through the air intake manifold 14. The upper and lower air conduits 24 and 26, respectively, join with each other within the fuel rail to form a single exit port 30 which mates with the air intake passageway 16 provided in the cylinder head 12 of the engine.

A fuel injector valve 32 is mounted in a fuel injector well 42. The fuel injector valve 32 injects fuel into the air intake passageway 16 of the cylinder head 12 to provide the proper quantity of fuel for operation of the engine as is known in the art.

The details of the fuel rail 10 are shown in FIGS. 2 through 6. Referring to FIG. 2, there is shown two separate fuel rail blocks 34 and 36 which when connected together form the fuel rail 10 for a four cylinder in line internal combustion engine. The use of two separate fuel rail blocks is preferred because it reduces the length of the individual fuel rail blocks, thereby reducing the elongation and flexing required if the mounting face of the cylinder head 12 does not remain flat. The configurations of the two fuel rail blocks 34 and 36 are basically the same. However, there are some differences as shall be explained hereinafter.

The fuel rail blocks 34 and 36 are molded from a high temperature plastic material such as Thermoset manufactured by Fiberite (I.C.I) of Winona, Minn. which also is a fairly good thermal insulator. The advantage of making the fuel rail blocks 34 and 36 from a thermal insulating material is that it reduces the heating of the fuel being delivered to the fuel injector and allows the air intake manifold 14 to be made from a lower temperature plastic material. The use of lower temperature plastic material in the fabrication of the air intake manifold 14 has significant benefits in terms of formability, finished part elongation and weight.

Figure 4:
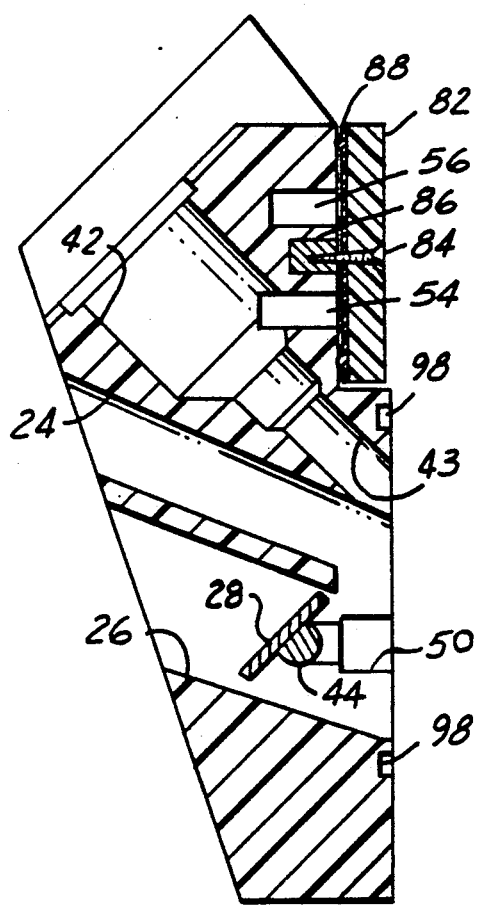
FIG. 4 is a cross-sectional view of the fuel rail taken along section lines 4—4 of FIG. 2 showing the details of the air conduits and fuel injector well.

FIG. 2 is a front view of the fuel rail blocks 34 and 36 showing the details of the faces 38 and 40 which mate with the air intake manifold 14. As shown, the first fuel rail block 34 has a pair of upper air conduits 24A and 24B, a pair of lower air conduits 26A and 26B, respectively and a pair of fuel injector wells 42A and 42B. A fuel injector valve such as the fuel injector valve 32 is mountable in each of the fuel injector wells 42A and 42B as shown in FIG. 1. Each of the fuel injector wells 42A and 42B has an exit or outlet port 43, as shown in FIG. 4, through which the fuel injector can inject fuel directly into the air intake passageway 16 of the cylinder head 12. The upper air conduit 24A, the lower air conduit 26A, and the fuel injector well 42A are associated with an end cylinder of the four cylinder engine. The upper air conduit 24B, the lower air conduit 26B, and the fuel injector well 42B are associated with a cylinder adjacent to the end cylinder of the internal combustion engine.

Figure 3:
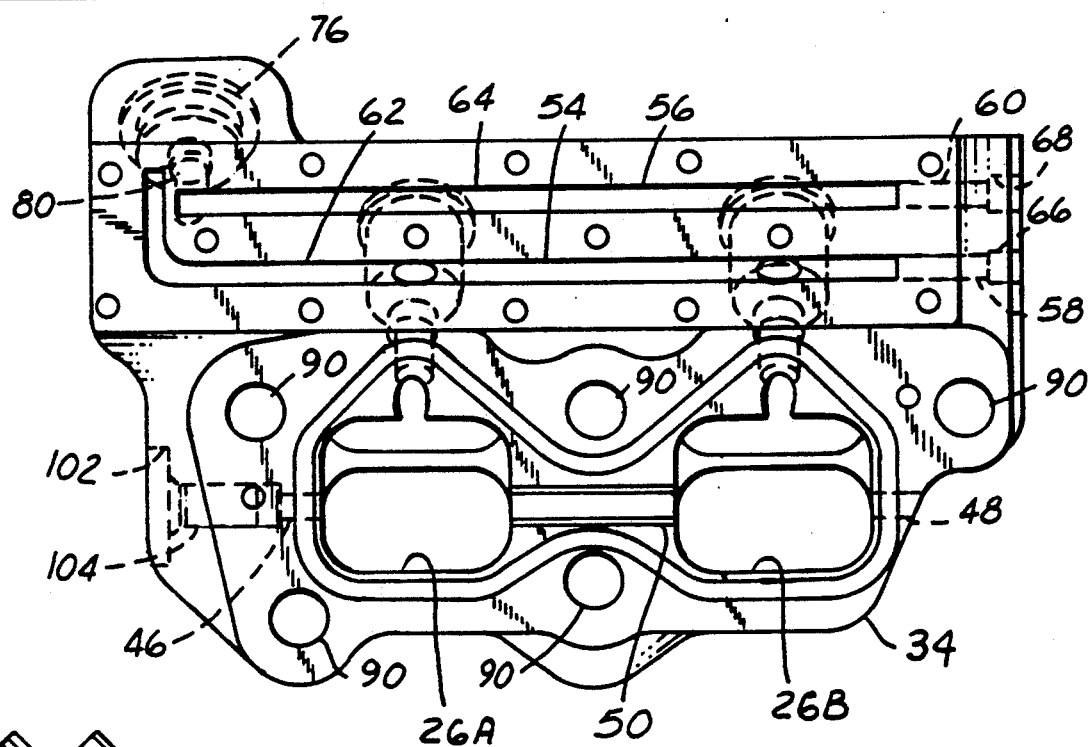
FIG. 3 is a rear view of the fuel rail block 34 showing the details of the face interfacing with the cylinder head.

Each of the lower air conduits 26A and 26B has a wave deflector 28 rotatably disposed therein. The wave deflector 28 is attached to an actuator shaft 44 rotatably received in a pair of shaft support bores 46 and 48 provided in the opposite ends of the first fuel rail block 34 as shown in FIG. 3. A shaft trough 50 is provided in the first fuel rail block 34 between the lower air conduits 26A and 26B to permit the actuator shaft 44 to extend freely between the shaft support bores 46 and 48, respectively. As shown more clearly in FIG. 5, the bottom of the shaft trough 50 may be rounded to mate with the external surface of the actuator shaft 44.

The first fuel rail block 34 also has a fuel delivery rail 54 and a fuel return rail 56. To facilitate the formation of the fuel delivery rail 54 and the fuel return rail 56 when the fuel rail block is made by a molding process, only the end portions 58 and 60 of the fuel delivery rail 54 and the fuel return rail 56, respectively, are fully enclosed. The remaining portions of the fuel delivery rail 54 and the fuel return rail 56, respectively, are three-sided troughs 62 and 64 as best illustrated in FIG. 3. The end portions 58 and 60 of the fuel delivery and fuel return rails 54 and 56 have an enlarged annular recess 66 and 68, respectively, in which are received one end of fuel rail couplings 72 and 70. Each of the fuel rail couplings 70 and 72 have a pair of annular recesses for receiving a pair of resilient "0" ring seals 74 which provide a fluid tight seal between the fuel delivery and fuel return rails 54 and 56 and the external surfaces of the fuel rail couplings 70 and 72.

Figure 6:
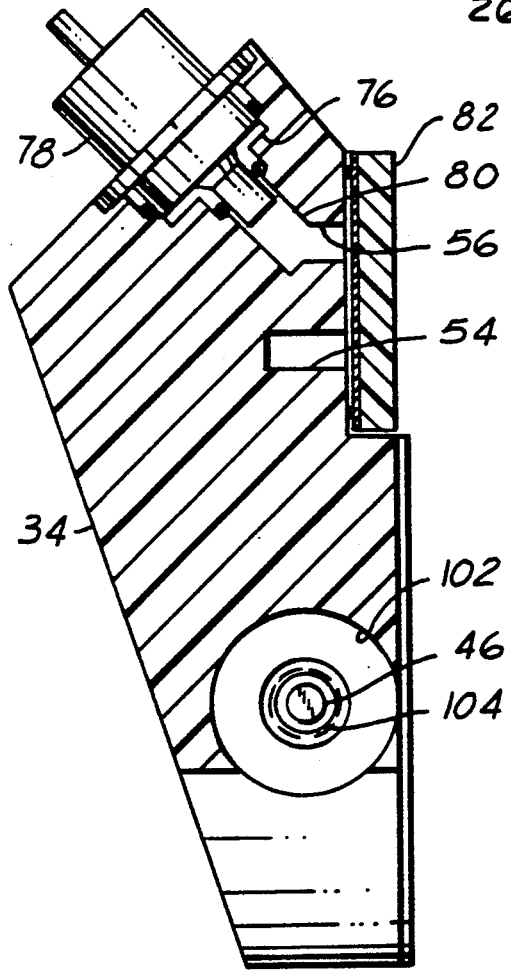
FIG. 6 is a cross-sectional view of the fuel rail taken along section lines 6—6 of FIG. 2 showing the connection of the fuel delivery and return rail to the pressure regulator.

The fuel delivery rail 54 is connected to both of the fuel injector wells 42A and 42B as more clearly shown in FIG. 4 and is connected to an inlet port of a pressure regulator well 76. As shown in FIG. 6, a pressure regulator 78 is mounted in the pressure regulator well 76 and controls the fuel pressure in the fuel delivery rail 54 in a known manner. A discharge port 80 of the pressure regulator well 76 is connected to the fuel return rail 56 as shown in FIGS. 3 and 6.

Figure 5:
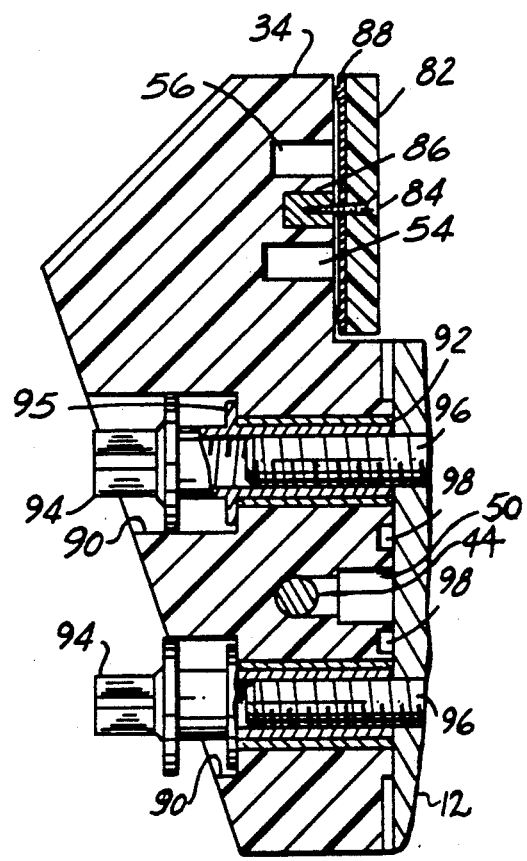
FIG. 5 is a cross-sectional view of the fuel rail taken along section lines 5—5 of FIG. 2 showing the details of the mounting to the cylinder head.

The fourth side or the open side of each of the trough portions 62 and 64 of the fuel delivery is fuel return rails 54 and 56 are closed by a cover plate 82. The cover plate 82 is attached to the first fuel rail block 34 by a plurality of threaded fasteners, such as screws 84, as shown in FIGS. 4 and 5, threadably received in a like plurality of threaded inserts 86 provided in the fuel rail block as shown in FIGS. 5 and 6. An elastomer seal 88 having raised sealing ribs is fused to the surface of the cover plate 82 on the surface adjacent to the first fuel rail block 34. The sealing ribs of the elastomer seal 88 forms a fluid seal between the first fuel rail block 34 and the cover plate 82 circumscribing the trough portion 62 of the fuel delivery rail 54 and a fluid seal between the first fuel rail block 34 and the cover plate 82 circumscribing the trough portion 64 of the fuel return rail 56.

The first fuel rail block 34 also has a plurality of counterbored mounting holes 90. As shown in FIG. 5, a plastic sleeve 92 is inserted in each of the mounting holes 90. The first fuel rail block 34 is attached to the cylinder head by a threaded tube nut 94 threadably received on a threaded stud 96 protruding from the cylinder head 12. The threaded tube nut 94 has a shoulder 95 that will limit the compressive loads applied to the first fuel rail block 34. A seal groove 98 is provided on the face of the first fuel rail block 34 as shown in FIGS. 4 and 5. The seal groove 98 surrounds the exit port 30 and is shaped to exclude the mounting holes 90 from the sealed area. A molded seal 100, as shown in FIG. 1, is received in the seal groove 98 to prevent extraneous air from leaking into the air passageway 16 of the cylinder head 12.

An annular recess 102 and a threaded end portion 104 may be provided at the end of the shaft support bore 46 to facilitate the mounting of a wave deflector actuator, not shown.

The construction of the second fuel rail block 36 is similar to the construction of the first fuel rail block 34. As shown in FIG. 2, the second fuel rail block 36 has a pair of upper air conduits 24C and 24D, a pair of lower air conduits 26C and 26D, and a pair of fuel injector wells 42C and 42D. The upper and lower air conduits 24C and 26C and the fuel injector well 42C are associated with the third cylinder of the internal combustion engine and the upper and lower air conduit 24D and 26D and the fuel injector well 42D are associated with the fourth cylinder of the internal combustion engine.

The fuel injector wells 42C and 42D are connected to a second fuel delivery rail 106 which has an annular recess 108 at the end adjacent to the first fuel rail block 34 for receiving the other end of the fuel rail coupling 72 therein. The fuel rail coupling 72 sealingly connects the first and second fuel delivery rails, 54 and 106 together. The other end of the second fuel delivery rail 106 has an annular recess 110 in which is received an inlet fuel line connector 112. The intermediate portion of the second fuel delivery rail 106 is fabricated in the form of a three-sided trough similar to the three-sided trough 62 of the first fuel rail block 34.

The second fuel rail block also has a second fuel return rail 114 which has an annular recess 116 at the end adjacent to the first fuel rail block 34. The annular recess 116 receives the other end of the fuel rail coupling 70. The other end of the second fuel return rail 114 has a second annular recess 118 in which is received an output fuel line connector 120. The intermediate portion of the second fuel return rail 114 is also in the form of a three-sided trough corresponding to the three-sided trough 64 of the first fuel rail block 34. A cover plate, not shown, similar to the cover plate 82 covers and seals the fourth side of the three-sided trough portion of the second fuel delivery and second fuel return rails 106 and 114, respectively.

The lower air conduits 26C and 26D each have a wave deflector 28 rotatably mounted therein and connected for rotation with the actuator shaft 44. The second fuel rail block 36 also has a pair of shaft support bores comparable to the shaft support bores 46 and 48 of the first fuel rail block 34 for rotatably supporting the actuator shaft 44 therein, and a shaft clearance trough between the lower air conduits 26C and 26D.

A plurality of counterbored holes 122 corresponding to the counterbored holes 90 are provided for mounting the second fuel rail block 36 to the cylinder head 12 of the internal combustion engine as described relative to the first fuel rail block 34.

As discussed above, only the first fuel rail block 34 has a pressure regulator well 76 for receiving a pressure regulator 78. In contrast, the second fuel rail block is the only one that has input and return fuel line connectors, such as the fuel line connectors 112 and 120.

It is understood that for a V-type or opposed four cylinder internal combustion engine, the first and second fuel rail blocks 34 and 36 may not be adjacent to each other as shown in FIG. 2, but would be mounted on different cylinder heads. It is also to be understood that the molded fuel rail is not limited to four cylinder engines, but may be used in conjunction with V-type six cylinder engines in which each fuel rail block has three upper and three lower air conduits and three fuel injector wells.

It is not intended that the invention be limited to the specific embodiment shown, and that changes may be made by those skilled in the art within the spirit of the invention as set forth in the appended claims.

What is claimed is:

1. For an internal combustion engine having at least four cylinders, a pressurized fuel source, an air intake manifold, and a cylinder head having an air intake passageway for each cylinder, a fuel rail comprising:

a high temperature plastic first fuel rail block;

means for attaching said first fuel rail block to the engine cylinder head;

at least two air conduits provided in said first fuel rail block, each of said at least two air conduits providing for communication of the engine air intake manifold to a respective one of the air intake passageways of the engine cylinder head;

at least two injector wells provided in said first fuel rail block, a respective fuel injector valve disposed in each respective one of said at least two injector wells, each of said at least two injector wells being associated with a respective one of said at least two air conduits and having an outlet port in communication with the respective air conduit, each of said at least two fuel injector wells supporting the respective fuel injector valve at a predetermined angle relative to the respective air conduit to cause the respective fuel injector valve to inject fuel directly into the respective air intake passageway;

a pressure regulator well provided in said first fuel rail block, a fuel pressure regulator disposed in said pressure regulator well, said fuel pressure regulator having an inlet port and an outlet port;

a first fuel delivery rail provided in said first fuel rail block, said first fuel delivery rail having an inlet port for receiving fuel from the engine pressurized fuel source and an outlet port in communication with said inlet port of said fuel pressure regulator, said first fuel delivery rail being in communication with said at least two injector wells to supply fuel to the fuel injectors disposed therein;

a first fuel return rail provided in said first fuel rail block, said first fuel return rail having an inlet port and an outlet port, said outlet port of said first fuel return rail being in communication with the outlet port of said fuel pressure regulator;

a high temperature plastic second fuel rail block;

means for attaching said second fuel rail block to the engine cylinder head;

at least two further air conduits provided in said second fuel rail block, each of said at least two further air conduits providing for the communication of the engine air intake manifold to a respective further one of the air intake passageways of the cylinder head;

at least two further injector wells provided in said second fuel rail block, a respective further fuel injector valve disposed in each respective one of said at least two further injector wells, each of said at least two further injector wells being associated with a respective one of said at least two further air conduits and having an outlet port in communication with the respective further air conduit, each of said at least two further injector wells supporting the respective further fuel injector valve at a predetermined angle relative to the respective further air conduit to cause the fuel injected by the respective further fuel injector valve to be injected directly into the respective further air intake passageway;

a second fuel delivery rail provided in said second fuel rail block in communication with said at least two further injector wells, said second fuel delivery rail having an inlet port for connection to the engine pressurized fuel source and also having an outlet port;

means fluid-connecting said outlet port of said second fuel delivery rail to said inlet port of said first fuel delivery rail;

a second fuel return rail provided in said second fuel rail block, said second fuel return rail having an outlet port for return fuel leaving the fuel rail and also having an inlet port; and means fluid-connecting said inlet port of said second fuel return rail to said outlet port of said first fuel return rail;

wherein at least a portion of said fuel delivery rail of one of said fuel rail blocks and at least a portion of said fuel return rail of said one of said fuel rail blocks comprise respective troughs, and including cover plate means closing said troughs such that said portions of said fuel delivery rail and of said fuel return rail of said one of said fuel rails blocks are cooperatively defined by said troughs and said cover plate means.

2. A fuel rail as set forth in claim 1 wherein said cover plate means comprises a resilient sealing means disposed against said one of said fuel rail blocks.

3. A fuel rail as set forth in claim 2 wherein said resilient sealing means comprises raised ribs disposed against said one of said fuel rail blocks.

4. A fuel rail as set forth in claim 1 wherein at least a portion of said fuel delivery rail of the other of said fuel rail blocks and at least a portion of said fuel return rail of said other of said fuel rail blocks comprise respective further troughs, and including further cover plate means closing said further troughs such that said portions of said fuel delivery rail and of said fuel return rail of said other of said fuel rails blocks are cooperatively defined by said further troughs and said further cover plate means.

5. For an internal combustion engine having at least four cylinders, a pressurized fuel source, an air intake manifold, and a cylinder head having an air intake passageway for each cylinder, a fuel rail comprising in combination with said cylinder head:

a high temperature plastic first fuel rail block;
means for attaching said first fuel rail block to said engine cylinder head;
at least two air conduits provided in said first fuel rail block, each of said at least two air conduits providing for communication of the engine air intake manifold to a respective one of the air intake passageways of the engine cylinder head;
at least two injector wells provided in said first fuel rail block, a respective fuel injector valve disposed in each respective one of said at least two injector wells, each of said at least two injector wells being associated with a respective one of said at least two air conduits and having an outlet port in communication with the respective air conduit, each of said at least two fuel injector wells supporting the respective fuel injector valve at a predetermined angle relative to the respective air conduit to cause the respective fuel injector valve to inject fuel directly into the respective air intake passageway;
a pressure regulator well provided in said first fuel rail block, a fuel pressure regulator disposed in said pressure regulator well, said fuel pressure regulator having an inlet port and an outlet port;
a first fuel delivery rail provided in said first fuel rail block, said first fuel delivery rail having an inlet port for receiving fuel from the engine pressurized fuel source and an outlet port in communication with said inlet port of said fuel pressure regulator, said first fuel delivery rail being in communication with said at least two injector wells to supply fuel to the fuel injectors disposed therein;
a first fuel return rail provided in said first fuel rail block, said first fuel return rail having an inlet port and an outlet port, said outlet port of said first fuel return rail being in communication with the outlet port of said fuel pressure regulator;
a high temperature plastic second fuel rail block;
means for attaching said second fuel rail block to said engine cylinder head;
at least two further air conduits provided in said second fuel rail block, each of said at least two further air conduits providing for the communication of the engine air intake manifold to a respective further one of the air intake passageways of said cylinder head;
at least two further injector wells provided in said second fuel rail block, a respective further fuel injector valve disposed in each respective one of said at least two further injector wells, each of said at least two further injector wells being associated with a respective one of said at least two further air conduits and having an outlet port in communication with the respective further air conduit, each of said at least two further injector wells supporting the respective further fuel injector valve at a predetermined angle relative to the respective further air conduit to cause the fuel injected by the respective further fuel injector valve to be injected directly into the respective further air intake passageway;
a second fuel delivery rail provided in said second fuel rail block in communication with said at least two further injector wells, said second fuel delivery rail having an inlet port for connection to the engine pressurized fuel source and also having an outlet port;
means fluid-connecting said outlet port of said second fuel delivery rail to said inlet port of said first fuel delivery rail;
a second fuel return rail provided in said second fuel rail block, said second fuel return rail having an outlet port for return fuel leaving the fuel rail and also having an inlet port; and
means fluid-connecting said inlet port of said second fuel return rail to said outlet port of said first fuel return rail;
said cylinder head comprising a face against which said first and second fuel rail blocks are disposed, said face comprising a plurality of threaded studs protruding therefrom, said means for attaching said first fuel rail block to said engine cylinder head and for attaching said second fuel rail block to said engine cylinder head comprising a plurality of through-holes in said first fuel rail block and in said second fuel rail block, said plurality of through-holes being in registry with said plurality of threaded studs with said plurality of threaded studs projecting into said plurality of through-holes, and a plurality of threaded tube nuts each of which passes into a corresponding one of said through-holes and threads onto a corresponding one of said threaded studs, each of said tube nuts having means bearing against the corresponding fuel rail block for holding said first and second fuel rail blocks against said cylinder head face.

6. A combination as set forth in claim 5 wherein at least a portion of said fuel delivery rail of one of said fuel rail blocks and at least a portion of said fuel return rail of said one of said fuel rail blocks comprise respective troughs, and including cover plate means closing said troughs such that said portions of said fuel delivery rail and of said fuel return rail of said one of said fuel rails blocks are cooperatively defined by said troughs and said cover plate means.

7. A combination as set forth in claim 5 wherein each of said through-holes comprises a counterbore forming a shoulder and each of said means bearing against the corresponding fuel rail block comprises a shoulder bearing against the shoulder of the corresponding counterbore.

8. For a multiple cylinder internal combustion engine having a pressurized fuel source, an air intake manifold, and a cylinder head having an air intake passageway for each cylinder, a fuel rail comprising:
   a high temperature plastic fuel rail block;
   means for attaching said fuel rail block to the engine cylinder head;
   a plurality of air conduits provided in said fuel rail block, each of said air conduits providing for communication of the engine air intake manifold to a respective one of the air intake passageways of the engine cylinder head;
   a plurality of injector wells provided in said fuel rail block, a respective fuel injector valve disposed in each respective one of said injector wells, each of said injector wells being associated with a respective one of said air conduits and having an outlet port in communication with the respective air conduit to cause the respective fuel injector valve to inject fuel directly into the respective air intake passageway;
   a pressure regulator well provided in said fuel rail block, a fuel pressure regulator disposed in said pressure regulator well, said fuel pressure regulator having an inlet port and an outlet port;
   a fuel delivery rail provided in said fuel rail block and being in communication with said injector wells for supplying fuel to the fuel injectors disposed therein, said fuel delivery rail having an inlet port for receiving fuel from the engine pressurized fuel source and an outlet port in communication with said inlet port of said fuel pressure regulator;
   a fuel return rail provided in said fuel rail block, said fuel return rail having an inlet port and an outlet port, said inlet port of said fuel return rail being in communication with the outlet port of said fuel pressure regulator; and
   wherein at least a portion of said fuel delivery rail and at least a portion of said fuel return rail comprise respective troughs, and including cover plate means closing said troughs such that said portions are cooperatively defined by said troughs and said cover plate means.

9. A fuel rail as set forth in claim 8 wherein said cover plate means comprises a resilient sealing means disposed against said fuel rail block.

10. A fuel rail as set forth in claim 9 wherein said resilient sealing means comprises raised ribs disposed against said fuel rail block.

11. For a multiple cylinder internal combustion engine having a pressurized fuel source, an air intake manifold, and a cylinder head having an air intake passageway for each cylinder, a fuel rail comprising in combination with said cylinder head:
   a high temperature plastic fuel rail block;
   means for attaching said fuel rail block to said engine cylinder head;
   a plurality of air conduits provided in said fuel rail block, each of said air conduits providing for communication of the engine air intake manifold to a respective one of the air intake passageways of said engine cylinder head;
   a plurality of injector wells provided in said fuel rail block, a respective fuel injector valve disposed in each respective one of said injector wells, each of said injector wells being associated with a respective one of said air conduits and having an outlet port in communication with the respective air conduit to cause the respective fuel injector valve to inject fuel directly into the respective air intake passageway;
   a pressure regulator well provided in said fuel rail block, a fuel pressure regulator disposed in said pressure regulator well, said fuel pressure regulator having an inlet port and an outlet port;
   a fuel delivery rail provided in said fuel rail block and being in communication with said injector wells for supplying fuel to the fuel injectors disposed therein, said fuel delivery rail having an inlet port for receiving fuel from the engine pressureized fuel source and also having an outlet port in communication with said inlet port of said fuel pressure regulator;
   a fuel return rail provided in said fuel rail block, said fuel return rail having an inlet port and an outlet port, said inlet port of said fuel return rail being in communication with the outlet port of said fuel pressure regulator; and
   said cylinder head comprising a face against which said fuel rail block is disposed, said face comprising a plurality of threaded studs protruding therefrom, said means for attaching said fuel rail block to said engine cylinder head comprising a plurality of through-holes in said fuel rail block, said plurality of through-holes being in registry with said plurality of threaded studs with said plurality of threaded studs projecting into said plurality of through-holes, and a plurality of threaded tube nuts each of which passes into a corresponding one of said through-holes and threads onto a corresponding one of said threaded studs, each of said tube nuts having means bearing against said fuel rail block for holding said fuel rail block against said cylinder head face.

12. A combination as set forth in claim 11 wherein at least a portion of said fuel delivery rail and at least a portion of said fuel return rail comprise respective troughs in said fuel rail block, and including cover plate means closing said troughs such that said portions of said fuel delivery rail and of said fuel return rail of said fuel rail block are cooperatively defined by said troughs and said cover plate means.

13. A combination as set forth in claim 11 wherein each of said through-holes comprises a counterbore forming a shoulder and each of said means bearing against said fuel rail block comprises a shoulder bearing against the shoulder of the corresponding counterbore.

14. In a multiple cylinder internal combustion engine having a pressurized fuel source, an air intake manifold, a cylinder head having an air intake passageway for each cylinder, and a fuel rail, the combination comprising:

a high temperature plastic fuel rail block;

means for attaching said fuel rail block to said engine cylinder head;

a plurality of air conduits providing for communication of the engine air intake manifold to a respective one of the air intake passageways of said engine cylinder head;

a plurality of injector wells provided in said fuel rail block, a respective fuel injector valve disposed in each respective one of said injector wells, each of said injector wells being associated with a respective one of said air intake passageways such that the respective fuel injector valve injects fuel directly into the respective air intake passageway;

a fuel delivery rail provided in said fuel rail block and being in communication with said injector wells for supplying fuel to the fuel injectors disposed therein, said fuel delivery rail having an inlet port for receiving fuel from the engine pressurized fuel source; and said cylinder head comprising a face against which said fuel rail block is disposed, said face comprising a plurality of threaded studs protruding therefrom, said means for attaching said fuel rail block to said engine cylinder head comprising a plurality of through-holes in said fuel rail block, said plurality of through-holes being in registry with said plurality of threaded studs with said plurality of threaded studs projecting into said plurality of through-holes, and a plurality of threaded tube nuts each of which passes into a corresponding one of said through-holes and threads onto a corresponding one of said threaded studs, each of said tube nuts having means bearing against said fuel rail block for holding said fuel rail block against said cylinder head face.

15. The combination as set forth in claim 14 wherein each of said through-holes comprises a counterbore forming a shoulder and each of said means bearing against the corresponding fuel rail block comprises a shoulder bearing against the shoulder of the corresponding counterbore.

* * * * *